(12) United States Patent
Ryan et al.

(10) Patent No.: US 12,490,961 B2
(45) Date of Patent: Dec. 9, 2025

(54) MEDICAL DEVICES AND RELATED METHODS

(71) Applicant: Boston Scientific Scimed, Inc., Maple Grove, MN (US)

(72) Inventors: Liam Ryan, County Waterford (IE); James Michael English, County Tipperary (IE); Robert Hannon, County Tipperary (IE); John O'Rourke, County Tipperary (IE); Mark David Mirigian, Kilkenny (IE); James J. Scutti, Norwell, MA (US)

(73) Assignee: Boston Scientific Scimed, Inc., Maple Grove, MN (US)

( * ) Notice: Subject to any disclaimer, the term of this patent is extended or adjusted under 35 U.S.C. 154(b) by 830 days.

(21) Appl. No.: 17/729,076

(22) Filed: Apr. 26, 2022

(65) Prior Publication Data
US 2022/0346763 A1     Nov. 3, 2022

Related U.S. Application Data

(60) Provisional application No. 63/180,772, filed on Apr. 28, 2021.

(51) Int. Cl.
*A61B 10/06*     (2006.01)
*B22F 10/22*     (2021.01)
*B33Y 10/00*     (2015.01)

(52) U.S. Cl.
CPC .................................. *A61B 10/06* (2013.01)

(58) Field of Classification Search
CPC .... A61B 10/02–06; A61B 2017/00526; A61B 2017/2926–2933; A61B 17/29; B33Y 80/00; B33Y 10/00
See application file for complete search history.

(56) References Cited

U.S. PATENT DOCUMENTS 5,366,477 A * 11/1994 LeMarie, III .......... A61B 17/29
                                                               403/336
5,478,350 A * 12/1995 Kratsch .................. A61B 17/29
                                                               606/174

(Continued)

FOREIGN PATENT DOCUMENTS

CN        110051409 A      7/2019
EP         3725242 A1     10/2020
(Continued)

OTHER PUBLICATIONS

Amfg, Autonomous Manufacturing, "Metal 3D Printing: A Definitive Guide", www.amfg.ai/2019/06/26/metal-3d-printing-a-definitive-guide/, Jun. 26, 2019, accessed Mar. 17, 2025 (Year: 2019).*

(Continued)

*Primary Examiner* — Matthew Kremer
*Assistant Examiner* — Aaron Merriam
(74) *Attorney, Agent, or Firm* — Bookoff McAndrews PLLC

(57) ABSTRACT

A medical device includes an operating member, a hub, and an end effector. The operating member includes an actuation portion. The hub includes a channel receiving the actuation portion of the operating member. The actuation portion of the operating member moves within the channel. The end effector is movable between a closed configuration and an open configuration. Distal extension of the operating member transitions the end effector to the open configuration, and proximal retraction of the operating member transitions the end effector to the closed configuration. The medical device is formed through an additive manufacturing process.

15 Claims, 3 Drawing Sheets

(56) References Cited

U.S. PATENT DOCUMENTS

| | | |
|---|---|---|
| 8,070,759 B2 | 12/2011 | Stefanchik et al. |
| 8,114,119 B2 | 2/2012 | Spivey et al. |
| 9,540,519 B2 | 1/2017 | Iwaya et al. |
| 10,089,416 B1 | 10/2018 | DuBose et al. |
| 10,639,109 B2 | 5/2020 | Bovay et al. |
| 2015/0359536 A1 | 12/2015 | Cropper et al. |
| 2017/0071585 A1* | 3/2017 | Adkisson ............... A61B 10/06 |
| 2018/0325581 A1 | 11/2018 | Mayer et al. |
| 2019/0053904 A1* | 2/2019 | Erickson .......... A61B 17/32056 |
| 2019/0099603 A1 | 4/2019 | Kronmueller et al. |
| 2020/0138444 A1 | 5/2020 | Martinez et al. |

FOREIGN PATENT DOCUMENTS

| | | |
|---|---|---|
| JP | H09-504963 A | 5/1997 |
| JP | 2018528006 A | 9/2018 |

OTHER PUBLICATIONS

Schwartz, Negri, Climaco, "Modeling and analysis of an auto-adjustable stroke end cushioning device for hydraulic cylinders", Oct. 2005, Journal of the Brazilian Society of Mechanical Sciences and Engineering 27(4) (Year: 2005).*

International Search Report and Written Opinion issued in International Application No. PCT/US2022/026259, issued Aug. 1, 2022 (40 pages).

* cited by examiner

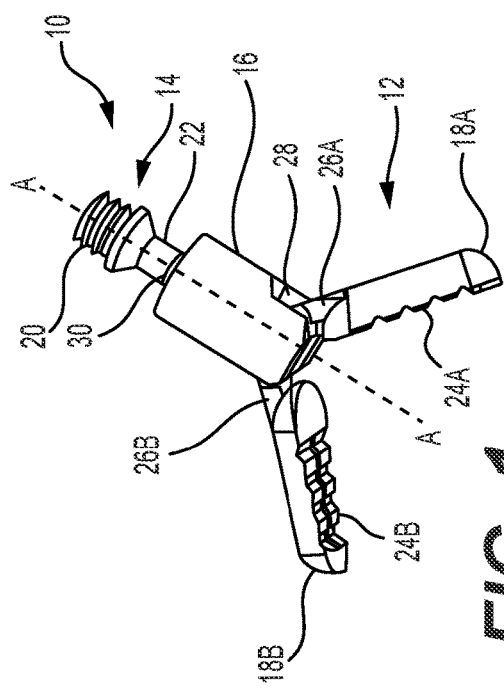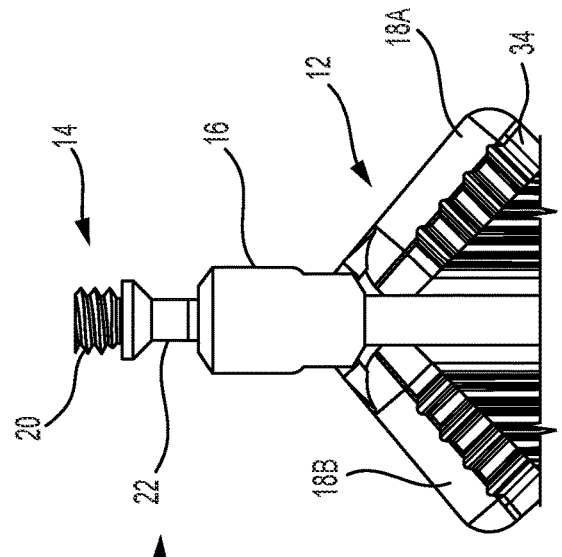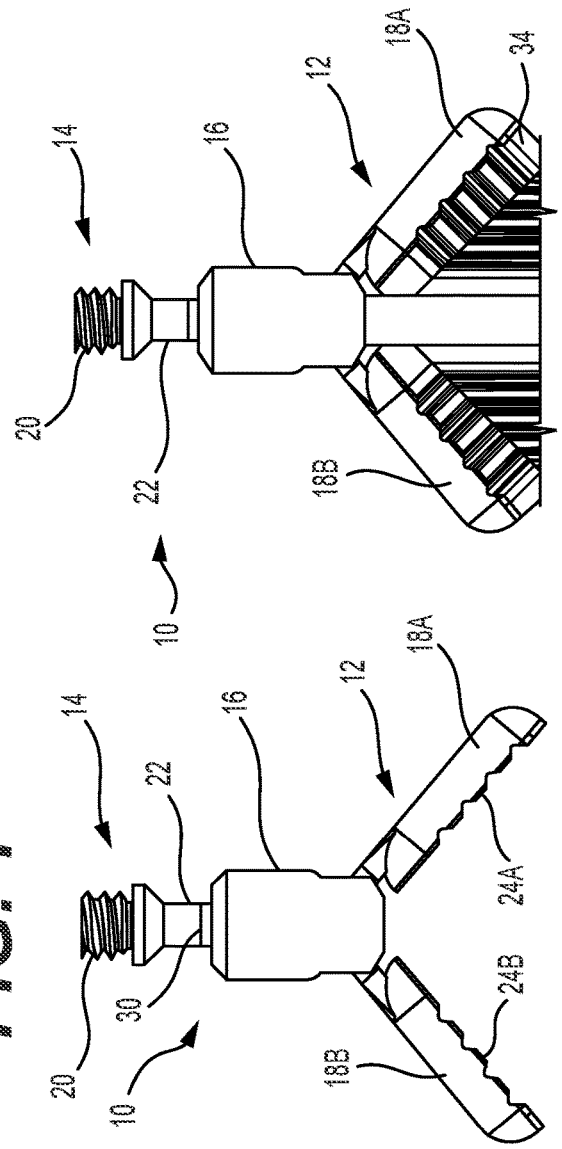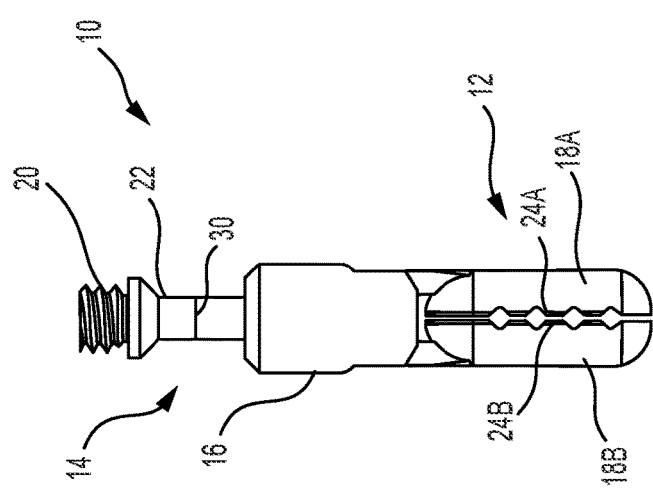

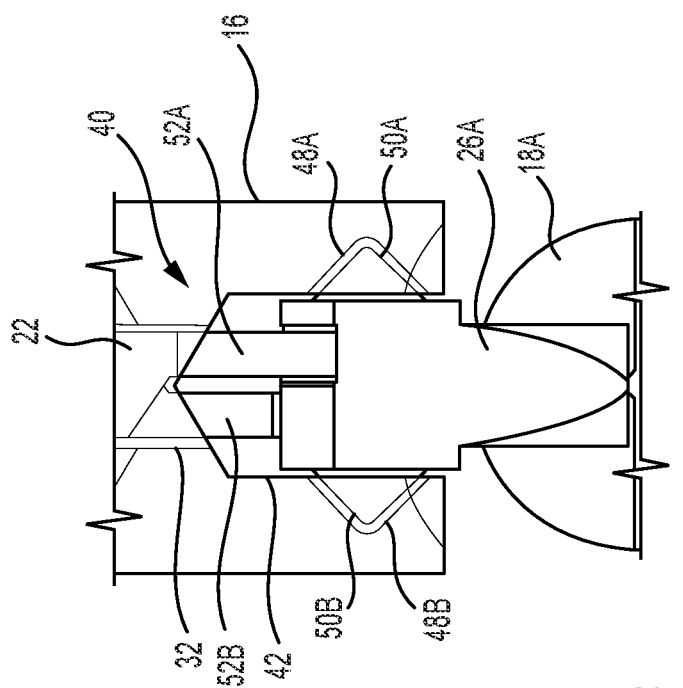
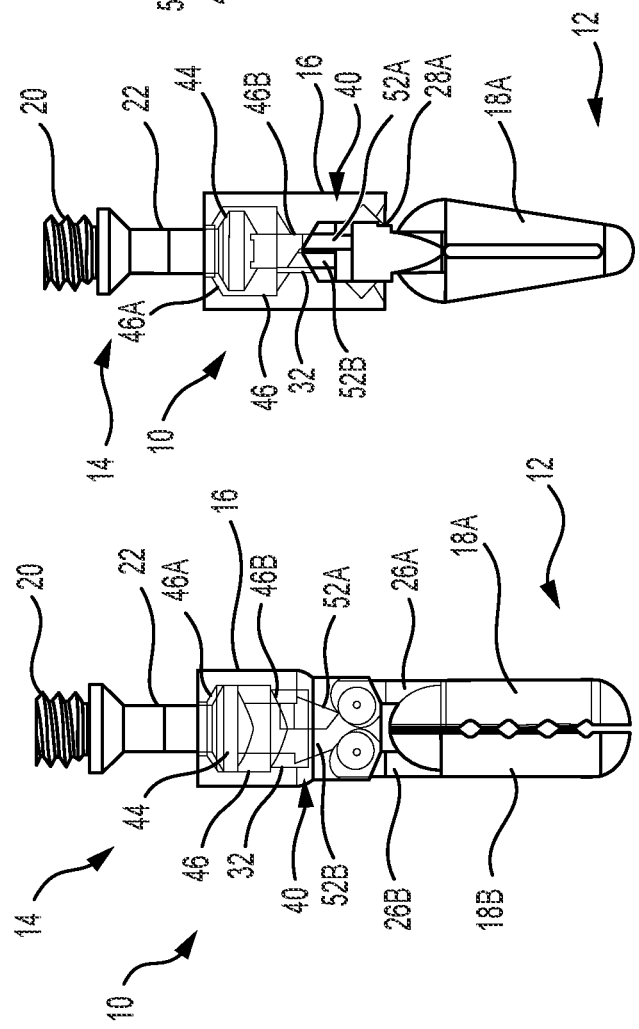

MEDICAL DEVICES AND RELATED METHODS

CROSS-REFERENCE TO RELATED APPLICATIONS

This patent application claims the benefit under 35 U.S.C. § 119 to U.S. Provisional Patent Application No. 63/180,772, filed on Apr. 28, 2021, the entirety of which is incorporated herein by reference.

TECHNICAL FIELD

Various aspects of this disclosure generally relate to medical devices and methods for manipulating or treating tissue or other material within a body. In particular, aspects of the disclosure relate to medical devices and methods for manufacturing and/or using a device that includes an end effector that is movable between an open configuration and a closed configuration.

BACKGROUND

Tissue samples or other materials are often examined to determine the presence of a pathological disorder. Endoscopic biopsy forceps may be used in conjunction with an endoscope for taking samples from the human body for analysis. Often, the samples must be obtained from deep within the body at locations that are difficult to access using standard forceps jaws (e.g., tissue from areas accessible only via tortuous biliary paths). Furthermore, a delivery device (e.g., an endoscope) or the sample site may limit the size of the forceps that can be used to access the tissue. Additionally, manufacturing and/or assembling the forceps jaws may be a costly and/or time-intensive procedure, as forceps (and other end effectors) often include multiple small, discrete, separately-manufactured parts or components that need to be assembled via intricate processes. These concerns may increase the duration, costs, and risks of the medical procedure. The devices and methods of this disclosure may rectify some of the deficiencies described above or address other aspects of the art.

SUMMARY

Examples of this disclosure relate to, among other things, devices and methods for manufacturing or using an end effector for one or more medical procedures. Each of the examples disclosed herein may include one or more of the features described in connection with any of the other disclosed examples.

In one example, a medical device may include an operating member, a hub, and an end effector. The operating member may include an actuation portion. The hub may include a channel receiving the actuation portion of the operating member. The actuation portion of the operating member may move within the channel. The end effector may be movable between a closed configuration and an open configuration. Distal extension of the operating member may transition the end effector to the open configuration, and proximal retraction of the operating member may transition the end effector to the closed configuration. The medical device may be formed through an additive manufacturing process.

The medical device may include one or more of the following features. The end effector may include a first arm and a second arm, and each of the first arm and the second arm may include a control portion that extends within the hub to interact with the actuation portion. The control portions of the first and second arms each may include an extension surface and a retraction surface offset from the extension surface. The hub may include indentations and the control portions may include extensions within the indentations, to pivotably hold the control portions within the hub. A distal portion of the actuation portion may include two prongs offset from each other, and each prong may include an extension face, a retraction face, an angled face, and an opening. Distal extension of the actuation portion may cause the extension face of one prong to contact the extension surface of one of the first and second arms and transition the one of the first and second arms to the open configuration. Proximal retraction of the actuation portion may cause the retraction face of the one prong to contact the retraction surface of the other one of the first and second arms and may transition the other one of the first and second arms to the closed configuration. The retraction surfaces of the first and second arms may be positioned within the openings in the prongs in the open configuration. The operating member may include a ring portion, and the hub may include a widened channel portion with proximal and distal stop surfaces that are configured to abut the ring portion to limit proximal and distal movement of the operating member.

The operating member may include a threaded coupling portion configured to couple the medical device to a drive element. The medical device may be formed of metal. The additive manufacturing process may include depositing successive layers of material on a build platform and selectively sintering portions of the layers to form the medical device. The selective sintering may be performed with a laser source. The additive manufacturing process may include forming one or more support structures, and separating the one or more support structures from the medical device using a wire electrical discharge machining process. The medical device may be exposed to one or more post-processing procedures after separation of the one or more support structures. The medical device may be approximately 1 cm in length.

In another aspect, a medical device may include an operating member, a hub, a first arm, and a second arm. The operating member may include an actuation portion. A distal portion of the actuation portion may include two prongs offset from each other, and each prong may include an extension face and a retraction face. The hub may include a channel receiving the actuation portion of the operating member, and the actuation portion of the operating member may move within the channel. The first arm and the second arm may be movable between a closed configuration and an open configuration. Each of the first arm and the second arm may include a control portion that extends within the hub to interact with the actuation portion of the operating member. The control portions of the first and second arms each may include an extension surface and a retraction surface offset from the extension surface. Distal extension of the actuation portion may cause the extension face of one prong to contact the extension surface of one of the first and second arms and may transition the one of the first and second arms to the open configuration. Proximal retraction of the actuation portion may cause the retraction face of the one prong to contact the retraction surface of the other one of the first and second arms and may transition the other one of the first and second arms to the closed configuration.

The medical device may include one or more of the following features. Each of the two prongs may include an opening positioned proximal of the retraction face, and the retraction surfaces of the first and second arms may be positioned within openings in the prongs in the open configuration. The operating member may include a ring portion and a coupling portion configured to couple the medical device to a drive element. The hub may include a widened channel portion with proximal and distal stop surfaces that are configured to abut the ring portion to limit proximal and distal movement of the operating member. The medical device may be formed of a metallic material via an additive manufacturing process.

In yet another aspect, a method of operating a medical device may include delivering the medical device to a treatment site. The medical device may include an operating member, a hub, a first arm, and a second arm. The operating member may include an actuation portion. A distal portion of the actuation portion may include two prongs offset from each other, and each prong may include an extension face and a retraction face. The hub may include a channel receiving the actuation portion of the operating member. The actuation portion of the operating member may move within the channel. The first arm and the second arm may be movable between a closed configuration and an open configuration. Each of the first arm and the second arm may include a control portion that extends within the hub to interact with the actuation portion. The control portions of the first and second arms each may include an extension surface and a retraction surface offset from the extension surface. The method may also include transitioning the first arm and the second arm to the open configuration. Transitioning the first arm and the second arm to the open configuration may include distally extending the operating member such that the extension face of one prong contacts the extension surface of one of the first and second arms and transitions the one of the first and second arms to the open configuration. The method may further include transitioning the first arm and the second arm to the closed configuration. Transitioning the first arm and the second arm to the closed configuration may include proximally retracting the operating member such that the retraction face of the one prong contacts the retraction surface of the other one of the first and second arms and transitions the other one of the first and second arms to the closed configuration.

It may be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate exemplary aspects of the disclosure and together with the description, serve to explain the principles of the disclosure.

FIG. 1 illustrates a perspective view of an exemplary medical device, according to aspects of this disclosure.

FIGS. 2A and 2B illustrate side views of the medical device of FIG. 1 in different configurations, according to aspects of this disclosure.

FIG. 3 illustrates a side view of the medical device in FIG. 1 in an intermediate stage of manufacture, according to aspects of this disclosure.

FIGS. 4A-4C illustrate different views of the medical device of FIG. 1, with portions of the medical device being transparent, according to aspects of the disclosure.

DETAILED DESCRIPTION

Figure 5B:
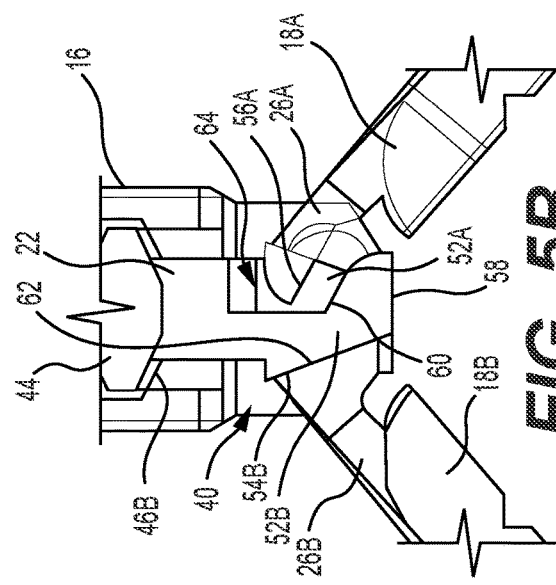
FIGS. 5A-5D illustrate side views of a portion of the medical device of FIG. 1 in different stages of use, with portions of the medical device being transparent, according to aspects of this disclosure.

The terms "proximal" and "distal" are used herein to refer to the relative positions of the components of an exemplary medical system and exemplary medical devices. When used herein, "proximal" refers to a position relatively closer to the exterior of the body or closer to a medical professional using the medical system or medical device. In contrast, "distal" refers to a position relatively further away from the medical professional using the medical system or medical device, or closer to the interior of the body. As used herein, the terms "comprises," "comprising," "having," "including," or other variations thereof, are intended to cover a non-exclusive inclusion, such that a system, device, or method that comprises a list of elements does not include only those elements, but may include other elements not expressly listed or inherent thereto. Unless stated otherwise, the term "exemplary" is used in the sense of "example" rather than "ideal." As used herein, the terms "about," "substantially," and "approximately," indicate a range of values within +/−10% of a stated value.

Examples of this disclosure include devices and methods for facilitating and/or improving the efficacy, efficiency, and/or safety of a medical procedure. Embodiments of the disclosure may relate to devices and methods for performing various medical procedures and/or treating portions of the large intestine (colon), small intestine, cecum, esophagus, stomach, any other portion of the gastrointestinal tract, kidney or other portion of the urinary tract, heart, lungs, and/or any other suitable patient anatomy. Various embodiments described herein include single-use or disposable medical devices. Some aspects of the disclosure may be used in performing an endoscopic, arthroscopic, bronchoscopic, ureteroscopic, colonoscopic, or other type of procedure. For example, the disclosed aspects may be used with duodenoscopes, bronchoscopes, ureteroscopes, colonoscopes, catheters, diagnostic or therapeutic tools or devices, or other types of medical devices. One or more of the elements discussed herein could be metallic, plastic, or include a shape memory metal (such as nitinol), a shape memory polymer, a polymer, or any combination of biocompatible materials.

Reference will now be made in detail to examples of the disclosure described above and illustrated in the accompanying drawings. Wherever possible, the same reference numbers will be used throughout the drawings to refer to the same or like parts. It is noted that one or more aspects of the medical devices discussed herein may be combined and/or used with one or more aspects of other medical devices discussed herein.

FIG. 1 illustrates a perspective view of an exemplary medical device 10 in an open configuration. Medical device 10 includes an end effector, for example, a forceps 12 at a distal end, an operating member 14 at a proximal end, and a hub 16 coupling forceps 12 and operating member 14. Forceps 12 includes a first arm 18A and a second arm 18B. Operating member 14 includes a coupling portion 20 and an actuation portion 22. Movement of operating member 14 (e.g., distally or proximally along a longitudinal axis A of medical device 10) transitions arms 18A and 18B of forceps 12 between a closed configuration (FIG. 2A) and an open configuration (FIG. 2B). In examples discussed herein, medical device 10 is formed via a three-dimensional printing or additive manufacturing process.

Arms 18A and 18B of forceps 12 may include a plurality of teeth 24A and 24B formed by a plurality of extensions and indentations (peaks and valleys) on an internal face of each of arms 18A and 18B. Arms 18A and 18B may also include tooth-free portions, for example, at a proximal end and/or a distal end of each of arms 18A and 18B. Additionally, arms 18A and 18B each include proximal control portions 26A and 26B that extend into hub 16. For example, hub 16 includes distal openings 28, and control portions 26A and 26B extend through respective distal openings 28. As discussed below, control portions 26A and 26B may interact with actuation portion 22 to control the opening and closing of arms 18A and 18B. In these aspects, arms 18A and 18B may be substantially identical, but mirror images. Furthermore, although not shown, in some aspects, one or more of arms 18A and 18B may include one or more drainage holes. The one or more drainage holes may extend through one or more of teeth 24A and 24B, for example, from the interior face of arms 18A and 18B to an exterior face of arms 18A and 18B. The one or more drainage holes may help to allow fluid to drain or otherwise flow out of forceps 12. In these aspects, the one or more drainage holes may be formed during the formation of medical device 10, for example, during the three-dimensional printing or additive manufacturing process.

Operating member 14 may be configured to couple a drive element (e.g., a drive wire) to medical device 10. For example, as shown, coupling portion 20 may include a threading, for example, to couple the drive element to operating member 14. However, this disclosure is not so limited, as coupling portion 20 may include other or additional coupling mechanisms, for example, an opening to form a press-fit or snap-fit coupling. Furthermore, although not shown, coupling portion 20 may be coupled to the drive element via soldering, welding, etc. Moreover, although also not shown, a sheath or tube may be coupled to hub 16 (e.g., coupled to a proximal portion of hub 16). For example, the sheath may be coupled to hub 16 via an adhesive. In this aspect, one or more portions of an outer surface of hub 16 may include lattice structures and/or rough surfaces, which may help the adhesion of the sheath to hub 16. In this manner, the drive element may be movable relative to the sheath (e.g., within a lumen of the sheath), via a proximal handle, for example, to control the movement of operating member 14 relative to hub 16.

Actuation portion 22 may be substantially cylindrical, and extends distally of coupling portion 20. Actuation portion 22 may extend through a proximal opening (not shown) in hub 16, and may be movable (proximally and/or distally) relative to hub 16 to control the position of arms 18A and 18B. For example, a distal portion of actuation portion 22 may interact with control portions 26A and 26B of arms 18A and 18B to control the opening and/or closing of arms 18A and 18B. Furthermore, actuation portion 22 may include one or more indications 30, which may help a user visualize the position of actuation portion 22 relative to hub 16, for example, via a visualization device (e.g., camera) positioned at a treatment site. The position of indication(s) 30 on actuation portion 22 may be indicative of the configuration of forceps 12, as shown in FIGS. 2A and 2B. In some aspects, indication(s) 30 may be radiopaque, and thus may be visualized via an X-ray or other visualization device outside of the patient.

As mentioned, hub 16 encloses portions of forceps 12 and operating member 14. Hub 16 includes distal openings 28 to receive control portions 26A and 26B of arms 18A and 18B. Additionally, although not shown, hub 16 includes a proximal opening to receive a portion of actuation portion 22. The proximal opening and distal openings 28 connect within hub 16 to form a channel 32 (FIGS. 4A and 4B) within hub 16. One or more portions of channel 32 may be generally cylindrical. Actuation portion 22 is movable within a portion of channel 32, and control portions 26A and 26B may be pivotably held or retained within a distal portion of channel 32.

FIG. 2A illustrates medical device 10 in a closed configuration, and FIG. 2B illustrates medical device 10 in an open configuration. In FIG. 2A, operating member 14, and thus actuation portion 22, is in a proximally retracted position relative to hub 16. Accordingly, arms 18A and 18B of forceps 12 are in a closed configuration, for example, with teeth 24A of arm 18A in contact with or close to teeth 24B of arm 18B. In FIG. 2B, operating member 14, and thus actuation portion 22, is in a distally extended position relative to hub 16, for example, with a greater portion of actuation portion 22 extended into hub 16. Accordingly, arms 18A and 18B of forceps 12 are in an open configuration, for example, with teeth 24A of arm 18A spaced apart from teeth 24B of arm 18B. Although not shown, medical device 10 may include one or more springs or biasing elements (e.g., internal to hub 16 or within a proximal handle (not shown)), which may bias medical device 10 toward the closed configuration or toward the open configuration.

As shown in FIG. 3, medical device 10 may be formed via a three-dimensional printing or additive manufacturing process. For example, a plurality of layers of material (e.g., layers of approximately 5 microns to approximately 50 microns thick, for example, approximately 25 microns thick) may be deposited on a build platform (not shown), and portions of the layers may be selectively sintered to form medical device 10. Portions of the layers may be sintered using a laser source. The layers of material may be determined using a three-dimensional model (e.g., a 3D CAD model) of medical device 10 and a slicing software. In this aspect, layers of powder (e.g., a metallic powder) may be successively applied to the build platform, and portions of each layer may be melted (e.g., with the laser source) to solidify the powder and, optionally, solidify the portion of the layer to a layer beneath it. The laser source only fires on the build platform in one or more locations that define the part geometry for each particular layer. Furthermore, the laser source does not fire to melt other portion(s) of the layer that do not define the part geometry, for example, portion(s) of the layer that form a cavity in that layer. The portion(s) of the layer that do not define the part geometry remain as powder. The powder may be removed from the part during post-processing.

Moreover, one or more sacrificial or support structures 34 may be built to help support portions of medical device 10 during the formation process. For example, as shown in FIG. 3, medical device 10, including one or more sacrificial or support structures 34, may be built vertically on the build platform. The location and/or size of the one or more support structures 34 may be determined and implemented by the slicing software. For example, a support structure 34 may be formed to help support arms 18A and 18B of forceps 12. Support structure 34 may then be separated from forceps 12 after the formation process, for example, via a wire electrical discharge machining process. Although not shown, additional support structures may support coupling portion 20 and actuation portion 22 of operating member 14, hub 16, etc. during the formation process, and may be removed after formation. The separation of the one or more support structures 34 may also help to separate components (e.g., arms 18A and 18B from hub 16) in order for the components to be movable relative to one another.

Medical device 10 may be formed of a biocompatible metallic material, for example, stainless steel, titanium, etc. In this aspect, layers of a metallic powder may be deposited on the build platform, and selectively sintered to form layers of medical device 10. The one or more support structures 34 may be formed of the same metallic material, or may be formed of another material. Furthermore, one or more surface treatments or post-processing techniques or procedures (e.g., electropolishing, chemical etching, etc.) may be performed on medical device 10, for example, to smooth the surfaces of medical device 10 after separation from support structure(s) 34. Thus, once medical device 10 is formed, after support structure 34 is removed from medical device 10, and any post-processing procedures are performed, medical device 10 may be ready for use and not require additional assembly, except for the connection to a drive element, sheath, handle etc. Accordingly, unlike typical end effectors with multiple small, discrete, separately-manufactured parts that require assembly, medical device 10 does not require assembly other than mounting medical device 10 to control elements (e.g., a drive wire and a sheath).

Furthermore, based on medical device 10 being formed via a three dimensional printing or additive manufacturing process, medical device 10 may be smaller than typical medical devices or end effectors that include forceps. For example, as discussed above, portions of medical device 10 do not need to be connected to or otherwise coupled to other portions of medical device 10. In this aspect, medical device 10 may be approximately 7 cm or smaller in length, for example, approximately 5 cm in length, approximately 3 cm in length, approximately 2 cm in length, or approximately 1 cm in length (e.g., approximately 11 mm in length). Medical device 10 may be approximately 10 mm or smaller in width, for example, approximately 5 mm in width, approximately 2-3 mm in width, or approximately 2.4 mm in width. Additionally, in the open configuration, arms 18A and 18B of forceps 12 may form an opening (e.g., between the distal ends of arms 18A and 18B) that is approximately 6 mm to 12 mm in width, for example, approximately 9 mm in width.

FIGS. 4A-4C are different views of medical device 10, with hub 16 shown as being transparent. FIG. 4A is a side view of medical device 10, and shows arms 18A and 18B of forceps 12. FIG. 4B is a top view of medical device 10, for example, with medical device 10 rotated approximately 90 degrees along its longitudinal axis A (FIG. 1), and shows arm 18A of forceps 12, as arm 18B is blocked by arm 18A. FIG. 4C is an enlarged view of a portion of FIG. 4B.

As shown in FIGS. 4A-4C, arms 18A and 18B each include control portions 26A and 26B, respectively, which are positioned within hub 16. Control portions 26A and 26B are offset from a center of medical device 10 in a direction perpendicular to longitudinal axis A (e.g., horizontally offset and/or into the page in FIGS. 4A and 5A-5D). For example, as shown in FIGS. 4A and 5A-5D, control portion 26B is above and to the left of a portion of control portion 26A. Control portions 26A and 2B are pivotable (via action from actuation portion 22) to transition arms 18A and 18B between the closed and open configurations. As mentioned, actuation portion 22 extends within hub 16. Actuation portion 22 includes a distal end 40 that is configured to contact and move control portions 26A and 26B to transition arms 18A and 18B between the closed and open configurations. Distal end 40 and control portions 26A and 26B interact in a distal portion 42 of channel 32, as shown in FIG. 4C.

Moreover, actuation portion 22 includes a radial extension or ring portion 44, and hub 16 includes a widened channel 46 with a proximal stop surface 46A and a distal stop surface 46B. Ring portion 44 is positioned within widened channel 46, and proximal stop surface 46A and distal stop surface 46B limit the proximal and distal movement of actuation portion 22, and thus of operating member 14, relative to hub 16.

As shown in FIGS. 4B and 4C, medical device 10 may also include a contained conical hinge design. For example, hub 16 may include two indentations 48A and 48B that each extend radially outward in a generally conical shape. Control portions 26A and 26B of arms 18A and 18B may include extensions 50A and 50B, which may also have a generally conical shape. For example, FIG. 4B illustrates control portion 26A extending through distal opening 28A. Extensions 50A and 50B may be received and movable within indentations 48A and 48B, such that control portions 26A and 26B of arms 18A and 18B are retained within hub 16, and such that arms 18A and 18B are able to pivot between the closed and open configurations.

Additionally, distal end 40 of actuation portion 22 includes two prongs 52A and 52B. Prongs 52A and 52B are movable with actuation portion 22 and interact with control portions 26A and 26B to transition arms 18A and 18B between the closed and open configurations.

Figure 5D:
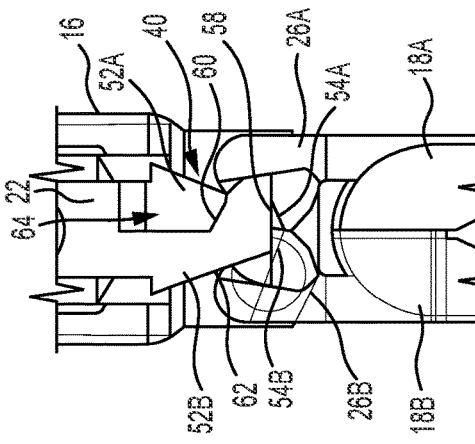
Figure 5A:
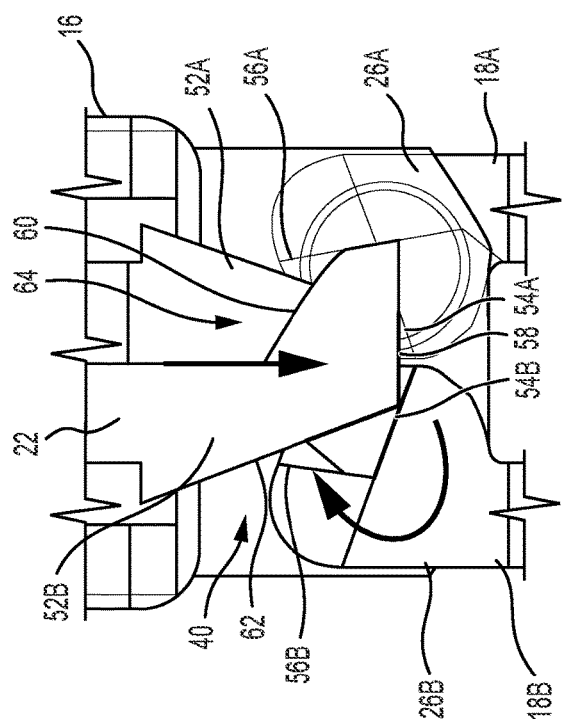

FIGS. 5A-5D illustrate further details of the interaction of actuation portion 22 with arms 18A and 18B within hub 16. FIG. 5A illustrates the transition from the closed configuration to the open configuration. For example, medical device 10 may be delivered to a treatment site, and actuation portion 22 and prongs 52A and 52B are extended distally (as shown by the vertical arrow), which pivots control portions 26A and 26B to separate and open arms 18A and 18B. Actuation portion 22 may be extended distally via action of the drive element coupled to coupling portion 20. In this aspect, control portions 26A and 26B each include an extension surface 54A and 54B and a retraction surface 56A and 56B. Extension surface 54A may be offset in a direction perpendicular to longitudinal axis A (e.g., laterally offset and offset in a direction out of the page in FIGS. 5A-5D) from retraction surface 56A. In this aspect, as shown in FIGS. 5A-5D, extension surface 54A may be above retraction surface 56A. Similarly, extension surface 54B may be offset in the direction perpendicular to longitudinal axis A (e.g., laterally offset and offset in a direction out of the page in FIGS. 5A-5D) from retraction surface 56B. In this aspect, as shown in FIGS. 5A-5D, extension surface 54B may be below retraction surface 56B.

Prongs 52A and 52B are offset from each other in the direction perpendicular to longitudinal axis A (e.g., laterally offset and offset in a direction out of the page in FIGS. 5A-5D). In this aspect, as shown in the side views of FIGS. 5A-5D, prong 52B is above prong 52A. Prongs 52A and 52B each include an extension face 58, a retraction face 60, and an angled face 62. The Figures show only extension face 58, retraction face 60, and angled face 62 for prong 52B. Extension face 58 of prong 52B may be perpendicular to longitudinal axis A (FIG. 1), and extension face 58 of prong 52B may contact and ride along extension surface 54B of control portion 26B to pivot arm 18B toward the open configuration. Although not shown, the extension face of prong 52A also may be perpendicular to longitudinal axis A and may contact and ride along the extension surface of control portion 26A to pivot arm 18A toward the open configuration. Similar to arms 18A and 18B, prong 52B may be a mirror image or have an inverse arrangement of prong 52A.

FIG. 5B illustrates medical device 10 in the open configuration. As shown, ring portion 44 may abut or be close to distal stop surface 46B, and arms 18A and 18B are separated. Moreover, angled face 62, which extends proximally at an angle from extension face 58, may be in contact with extension surface 54B of control portion 26B of arm 18B, along all or a substantial portion of extension surface 54B. Although not shown, the extension face of prong 52A may be in contact with the extension surface of control portion 26A of arm 18A. Moreover, retraction surface 56A of arm 18A may be positioned within an opening 64 of prong 52B, for example, proximal of retraction face 60. As shown, retraction face 60 is positioned proximal to extension face 58, and extends at an angle configured to correspond to (e.g., match and/or abut) retraction surface 56A of control portion 26A. Furthermore, although not shown, retraction surface 56B of arm 18B may be positioned within an opening of prong 52A.

Figure 5C:
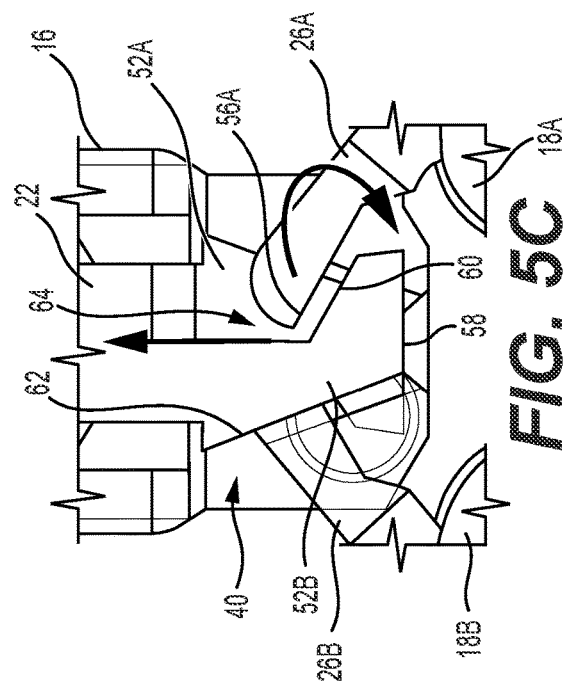

FIG. 5C illustrates the transition from the open configuration to the closed configuration, for example, to capture or otherwise treat tissue or other material at a treatment site. For example, actuation portion 22 and prongs 52A and 52B are retracted proximally (as shown by the vertical arrow), which pivots control portions 26A and 26B to close arms 18A and 18B. Actuation portion 22 may be retracted proximally via action of the drive element coupled to coupling portion 20. In this aspect, retraction face 60 of prong 52B contacts retraction surface 56A of control portion 26A, and pivots arm 18A toward the closed configuration. Similarly, although not shown, the retraction face of prong 52A contacts the retraction surface of control portion 26B, and pivots arm 18B toward the closed configuration.

FIG. 5D illustrates the closed configuration. In this aspect, actuation portion 22 and prongs 52A and 52B are proximally retracted. Moreover, in the closed configuration, extension face 58 of prong 52B may abut or be close to extension surface 54B of control portion 26B. The extension face of prong 52A may abut or be close to extension surface 54A of control portion 26A.

The steps shown in FIGS. 5A-5D may be performed as many times as necessary during a medical procedure, for example, to capture or otherwise manipulate tissue or other material. In this manner, the extension of one prong may transition a first arm of forceps 12 from the closed configuration to the open configuration, and retraction of the one prong may transition a second arm of forceps 12 from the open configuration to the closed configuration.

Although the end effector is described as forceps 12, this disclosure is not so limited. For example, various aspects of this disclosure may be used to form and/or use other end effectors that include pivoting, expandable, translatable, and/or openable elements. For example, the end effector may be a grasper, scissors, a clip, a stapler, a needle, a knife, etc.

Various aspects discussed herein may help to reduce the duration, costs, and/or risks of a medical procedure. For example, three-dimensional printing and/or additive manufacturing may help to reduce the number of necessary components to form a forceps or other medical device. Reducing the number of components allows for more efficient assembly, a reduced bill of materials or product structure, a reduced number of parts and/or part numbers, a reduced likelihood of breakage and/or malfunction, more lenient size and/or shape tolerances (e.g., no stacking of tolerances with assembled components), etc. Furthermore, a plurality of medical devices 10 may be manufactured on the same build platform, reducing manufacturing and assembly time, costs, etc.

Additionally, three-dimensional printing or additive manufacturing allows for medical device 10 to be a smaller size and/or have more complex designs than traditionally assembled medical devices. As a result, medical device 10 may be maneuverable and/or deliverable to or through small and/or tortuous locations or lumens in a patient. Medical device 10 may be operated via a drive element, with distal movement of the drive element transitioning medical device 10 to the open configuration (FIG. 2B), and proximal movement of the drive element transitioning medical device 10 to the closed configuration (FIG. 2A). Medical device 10 may also be able to target smaller locations (e.g., smaller portions of tissue), for example, than larger traditional medical devices.

Accordingly, various aspects discussed herein may help to improve the efficacy of treatment and/or recovery from a procedure, for example, a procedure to treat a treatment site. Various aspects discussed herein may help to reduce and/or minimize the duration of the procedure, and/or may help reduce risks of inadvertent contact with tissue or other material during delivery, repositioning, or usage of a medical device in the procedure.

While principles of this disclosure are described herein with reference to illustrative aspects for various applications, it should be understood that the disclosure is not limited thereto. Those having ordinary skill in the art and access to the teachings provided herein will recognize additional modifications, applications, aspects, and substitution of equivalents all fall within the scope of the aspects described herein. Accordingly, the disclosure is not to be considered as limited by the foregoing description.

We claim:

1. A medical device, comprising:
an operating member that includes an actuation portion;
a hub that includes a channel receiving the actuation portion of the operating member, wherein the actuation portion of the operating member is movable within the channel; and
an end effector, wherein the end effector is movable between a closed configuration and an open configuration,
wherein the operating member is extendable distally to transition the end effector to the open configuration and extend the actuation portion,
wherein the operating member is retractable proximally to transition the end effector to the closed configuration and retract the actuation portion, and
wherein the medical device is formed through an additive manufacturing process,
wherein the end effector includes a first arm and a second arm, wherein each of the first arm and the second arm includes a control portion that extends within the hub to interact with the actuation portion, wherein the control portions of the first and second arms each includes an extension surface and a retraction surface offset from the extension surface, wherein the hub includes indentations and the control portions include extensions within the indentations, to pivotably hold the control portions within the hub, wherein a distal portion of the actuation portion includes two prongs offset from each other, wherein each prong includes an extension face, a retraction face, an angled face, and an opening, wherein distal extension of the actuation portion is configured to (i) cause the extension face of one prong to contact the extension surface of one of the first and second arms and (ii) transition the one of the first and second arms to the open configuration, and wherein proximal retraction of the actuation portion is configured to (i) cause the retraction face of the one prong to contact the retraction surface of the other one of the first and second arms and (ii) transition the other one of the first and second arms to the closed configuration.

2. The medical device of claim 1, wherein the retraction surfaces of the first and second arms are positioned within the openings in the prongs in the open configuration.

3. The medical device of claim 1, wherein the operating member includes a ring portion, and wherein the hub includes a widened channel portion with proximal and distal stop surfaces that are configured to abut the ring portion to limit proximal and distal movement of the operating member.

4. The medical device of claim 1, wherein the operating member includes a threaded coupling portion configured to couple the medical device to a drive element.

5. The medical device of claim 1, wherein the medical device is formed of metal.

6. The medical device of claim 1, wherein the additive manufacturing process includes depositing successive layers of material on a build platform and selectively sintering portions of the layers to form the medical device.

7. The medical device of claim 6, wherein the selective sintering is performed with a laser source.

8. The medical device of claim 1, wherein the additive manufacturing process includes forming one or more support structures, and separating the one or more support structures from the medical device using a wire electrical discharge machining process.

9. The medical device of claim 8, wherein the medical device is exposed to one or more post-processing procedures after separation of the one or more support structures.

10. The medical device of claim 1, wherein the medical device is approximately 1 cm in length.

11. A medical device, comprising:
an operating member including an actuation portion, wherein a distal portion of the actuation portion includes two prongs offset from each other, and wherein each prong includes an extension face and a retraction face;
a hub that includes a channel receiving the actuation portion of the operating member, wherein the actuation portion of the operating member is movable within the channel; and
a first arm and a second arm that are movable between a closed configuration and an open configuration, wherein each of the first arm and the second arm includes a control portion that extends within the hub to interact with the actuation portion of the operating member, and wherein the control portions of the first and second arms each includes an extension surface and a retraction surface offset from the extension surface,
wherein the actuation portion is extendable distally to cause the extension face of one prong to contact the extension surface of one of the first and second arms and transition the one of the first and second arms to the open configuration, and wherein the actuation portion is retractable proximally to cause the retraction face of the one prong to contact the retraction surface of the other one of the first and second arms and transition the other one of the first and second arms to the closed configuration.

12. The medical device of claim 11, wherein each of the two prongs includes an opening, wherein the retraction surfaces of the first and second arms are positioned within openings in the prongs in the open configuration.

13. The medical device of claim 11, wherein the operating member includes a ring portion and a coupling portion configured to couple the medical device to a drive element, and wherein the hub includes a widened channel portion with proximal and distal stop surfaces that are configured to abut the ring portion to limit proximal and distal movement of the operating member.

14. The medical device of claim 11, wherein the medical device is formed of a metallic material via an additive manufacturing process.

15. A method of operating a medical device, comprising:
delivering the medical device to a treatment site, wherein the medical device includes:
an operating member including an actuation portion, wherein a distal portion of the actuation portion includes two prongs offset from each other, and wherein each prong includes an extension face and a retraction face;
a hub that includes a channel receiving the actuation portion of the operating member, wherein the actuation portion of the operating member moves within the channel; and
a first arm and a second arm that are movable between a closed configuration and an open configuration, wherein each of the first arm and the second arm includes a control portion that extends within the hub to interact with the actuation portion, and wherein the control portions of the first and second arms each includes an extension surface and a retraction surface offset from the extension surface;
transitioning the first arm and the second arm to the open configuration, wherein transitioning the first arm and the second arm to the open configuration includes distally extending the operating member such that the extension face of one prong contacts the extension surface of one of the first and second arms and transitions the one of the first and second arms to the open configuration; and
transitioning the first arm and the second arm to the closed configuration, wherein transitioning the first arm and the second arm to the closed configuration includes proximally retracting the operating member such that the retraction face of the one prong contacts the retraction surface of the other one of the first and second arms and transitions the other one of the first and second arms to the closed configuration.

* * * * *